US010846011B2

(12) United States Patent
Lipchuk et al.

(10) Patent No.: US 10,846,011 B2
(45) Date of Patent: Nov. 24, 2020

(54) MOVING OUTDATED DATA FROM A MULTI-VOLUME VIRTUAL DISK TO A BACKUP STORAGE DEVICE

(71) Applicant: Red Hat Israel, Ltd., Raanana (IL)

(72) Inventors: Maor Lipchuk, Raanana (IL); Arik Hadas, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 16/115,903

(22) Filed: Aug. 29, 2018

(65) Prior Publication Data

US 2020/0073551 A1 Mar. 5, 2020

(51) Int. Cl.
*G06F 12/00* (2006.01)
*G06F 3/06* (2006.01)

(52) U.S. Cl.
CPC ............ *G06F 3/065* (2013.01); *G06F 3/0604* (2013.01); *G06F 3/0665* (2013.01); *G06F 3/0673* (2013.01)

(58) Field of Classification Search
CPC ...... G06F 3/065; G06F 3/0673; G06F 3/0665; G06F 3/0604
See application file for complete search history.

(56) References Cited

U.S. PATENT DOCUMENTS 8,850,146 B1 * 9/2014 Majumdar ............. G06F 12/08 707/649
9,430,272 B2 8/2016 Bezbaruah et al.
9,740,577 B1 * 8/2017 Chakraborty ....... G06F 11/1469
9,772,907 B2 9/2017 Christopher et al.
9,921,875 B2 3/2018 Tsirkin
9,971,655 B1 5/2018 Li et al.
2004/0260972 A1 * 12/2004 Ji ........................ G06F 11/2066 714/11
2005/0193179 A1 * 9/2005 Cochran ............. G06F 11/2058 711/162
2009/0319532 A1 * 12/2009 Akelbein .............. G06F 16/185
2015/0378636 A1 12/2015 Yadav et al.
2018/0143880 A1 5/2018 Dornemann

OTHER PUBLICATIONS

"Plan your VM Backup Infrastructure in Azure", http://docs.microsoft.com/en-us/azure/backup-azure-vms-introduction, Mar. 23, 2018, retrieved on May 31, 2018, 9 pages.

Preston, W. Curtis, "Using Snapshot Backups to Replace Your Traditional Data Backup System", https://searchdatabackup.techtarget.com/feature/Using-snapshot-backups-to-replace-your-traditional-data-backup-system, Oct. 2010, retrieved on May 31, 2018, 5 pages.

* cited by examiner

*Primary Examiner* — Kalpit Parikh
(74) *Attorney, Agent, or Firm* — Lowenstein Sandler LLP

(57) ABSTRACT

A method includes identifying, by a host computing device hosting a virtual machine, a plurality of disk volumes of a virtual disk stored on a first storage device, wherein the disk volumes are arranged in a hierarchical order. The method further includes determining, by the host computing device, a block that is present in a first disk volume and a second disk volume of the plurality of disk volumes, wherein the second disk volume is at a higher level in the hierarchical order than the first disk volume. The method also includes copying, by the host computing device, data from the block stored on the first storage device to a backup disk volume residing on a second storage device and removing the block on the first storage device.

16 Claims, 6 Drawing Sheets

300

Identify, by a host computing device hosting a virtual machine, a plurality of disk volumes of a virtual disk stored on a first storage device, wherein the disk volumes are arranged in a hierarchical order.
310

Identify, by the host computing device, a block that is present in a first disk volume and a second disk volume of the plurality of disk volumes, wherein the second disk volume is at a higher level in the hierarchical order than the first disk volume.
320

Copy, by the host computing device, data from the block stored on the first storage device to a backup disk volume residing on a second storage device.
330

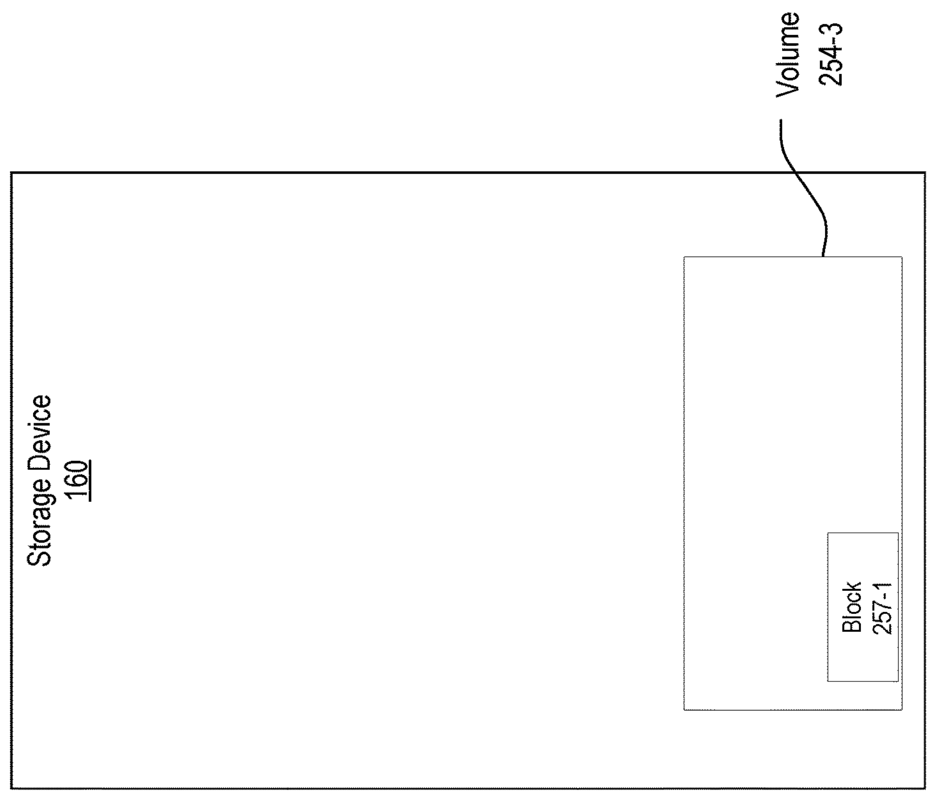
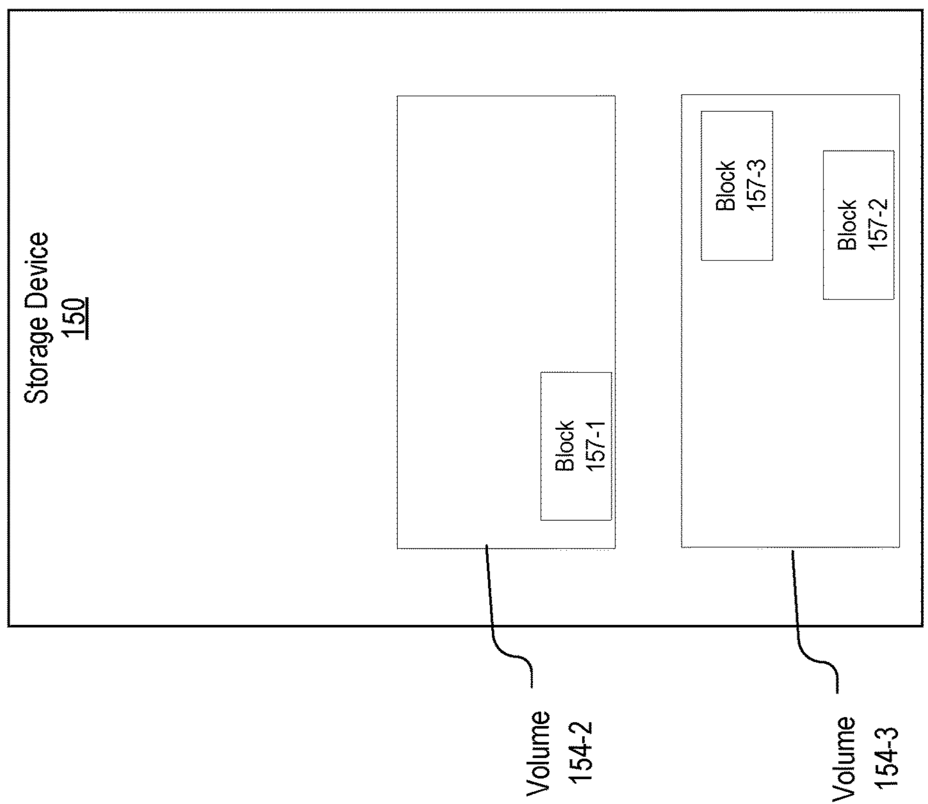
FIG. 2C

Figure 3:
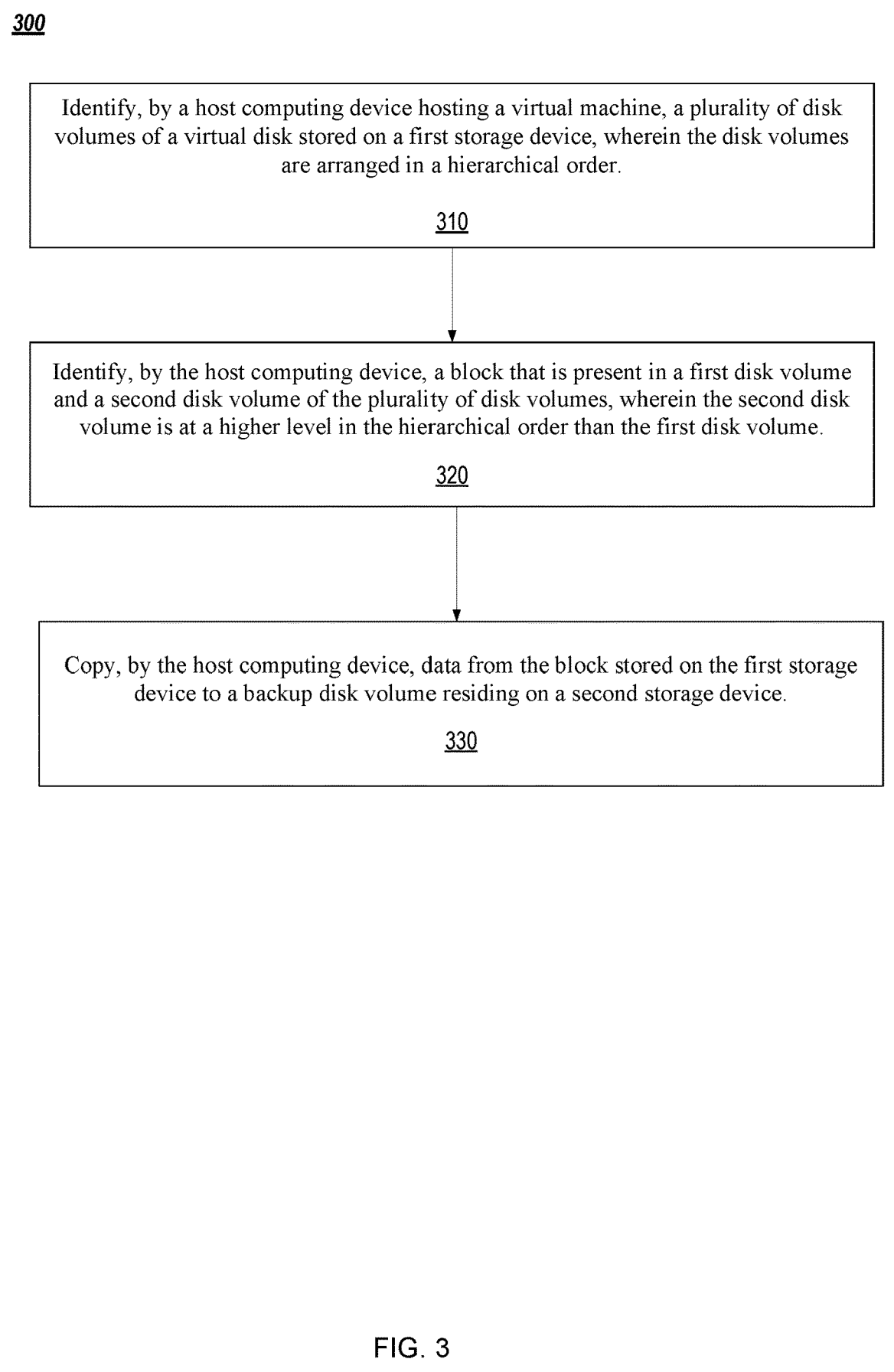

300

Identify, by a host computing device hosting a virtual machine, a plurality of disk volumes of a virtual disk stored on a first storage device, wherein the disk volumes are arranged in a hierarchical order.

310

Identify, by the host computing device, a block that is present in a first disk volume and a second disk volume of the plurality of disk volumes, wherein the second disk volume is at a higher level in the hierarchical order than the first disk volume.

320

Copy, by the host computing device, data from the block stored on the first storage device to a backup disk volume residing on a second storage device.

MOVING OUTDATED DATA FROM A MULTI-VOLUME VIRTUAL DISK TO A BACKUP STORAGE DEVICE

TECHNICAL FIELD

The present disclosure is generally related to virtual disk volume hierarchy. More specifically, the present disclosure is related to moving redundant data from an active storage device to a backup storage device.

BACKGROUND

Virtualization entails running programs, usually multiple operating systems, concurrently and in isolation from other programs on a single system. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. A hypervisor may save a state of a virtual machine at a reference point in time, which is often referred to as a snapshot. The snapshot can be used to restore or rollback the virtual machine to the state that was saved at the reference point in time. Typically, many snapshots of a virtual machine are taken and stored in an active storage device. Storing many snapshots (that may or may not be used at a later time) can consume valuable storage space in an active storage device.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2C depicts a block diagram of an example an active storage device and a backup storage device, in accordance with one or more aspects of the present disclosure.

FIG. 3 depicts a flow diagram of an example method for copying redundant data from an active storage device to a backup storage device, in accordance with one or more aspects of the present disclosure.

DETAILED DESCRIPTION

Figure 1:
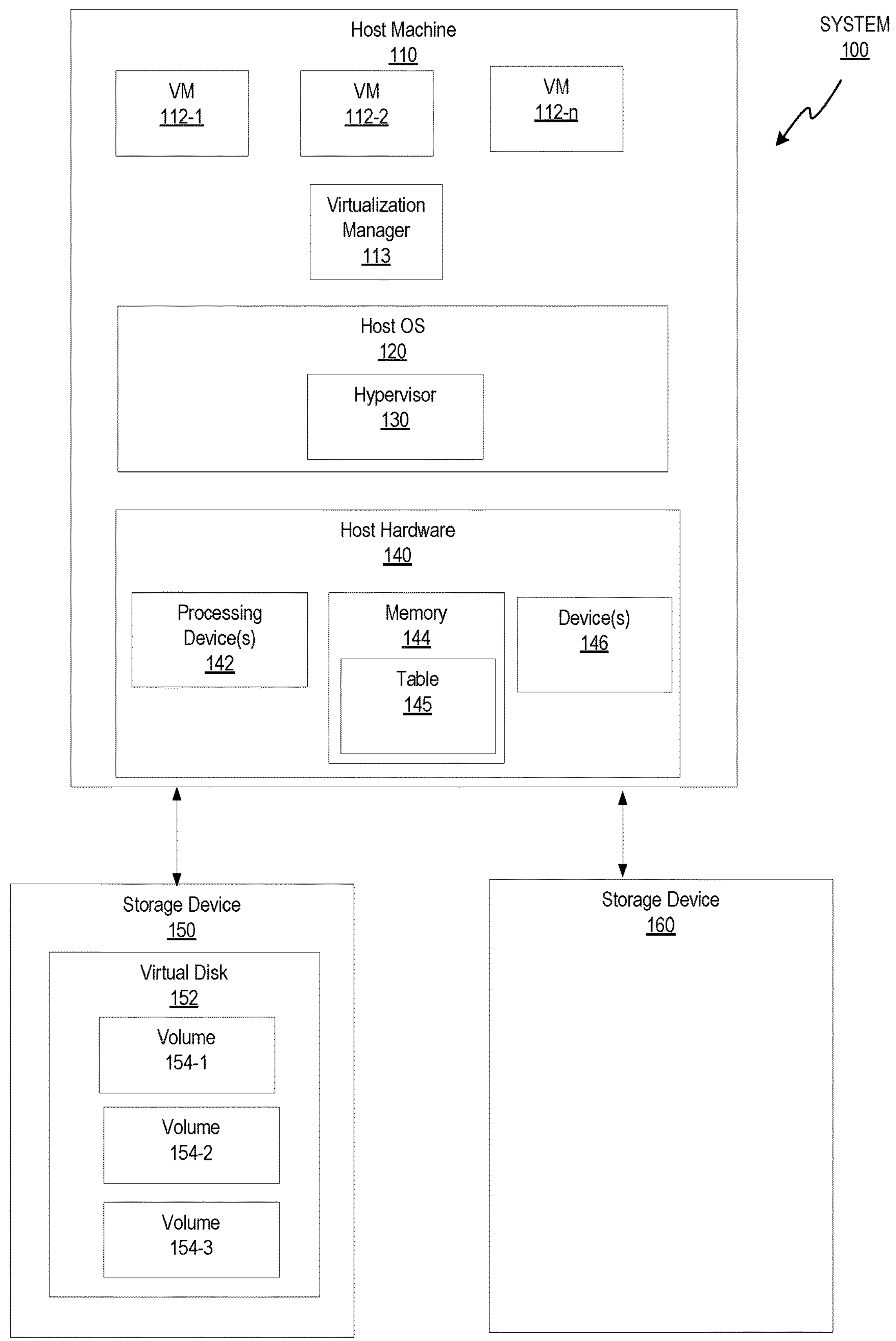
FIG. 1 depicts a block diagram of a host computer system in accordance with one or more aspects of the present disclosure.

As described above, a snapshot of a virtual machine can be used to restore or rollback the virtual machine to the state that was saved at the reference point in time. In some embodiments, snapshots of a virtual machine save the state of the virtual machine at certain points in time by use of a copy-on-write (COW) scheme.

A virtual machine disk image may be represented by a volume chain comprising one or more copy-on-write (COW) volumes (which may also be referred to as "layers"). From the perspective of a virtual machine, these volumes appear as a single disk image, as the hypervisor presents the virtual disk to a virtual machine and implements the associated disk read-write operations.

Initially, a virtual machine disk image may only comprise one raw or COW volume, which may be made read-only before the first boot of the virtual machine. An attempt to write to a disk by a virtual machine may trigger adding a new COW volume ("layer") to the volume chain. The newly created volume may be made writable, and may only store disk blocks or files which have been modified or newly created by the virtual machine after the previous volume ("layer") has been made read-only. One or more volumes may be added to the volume chain during the lifetime of the virtual machine. Adding a new COW volume may be triggered by making the previous volume read-only (e.g., responsive to receiving a command via an administrative interface).

The above described layered disk image structure may be utilized for creating virtual machine snapshots. A virtual machine snapshot may be viewed as a storage function allowing creation of a restore point of a virtual machine's operating system, applications, and data at a certain point in time. A snapshot saves the data currently present in a virtual machine hard disk image as a read-only volume and allows for a recovery to the disk image state as it existed at the time the snapshot was taken.

In an illustrative example, a virtual machine snapshot may be created (e.g., responsive to receiving a command via an administrative interface or an API interface) by causing the most recent volume in volume chain to become read-only, and adding a new COW volume to volume chain. Since the most recent volume in the volume chain has been made read-only, all write actions performed after the snapshot is taken are written to the newly added COW volume. Thus, the snapshot comprising the layered read-only volumes reflects the state of the virtual machine disk image at the time of snapshot creation (which may be defined as the time of making read-only the most recent volume in the volume chain).

Newly created COW volume initially only contains COW metadata (e.g., a reference to the previous volume in the volume chain, a volume format identifier, etc.). Data that is created by the virtual machine operation after the snapshot is taken is written to the newly created COW volume. When the virtual machine modifies the data that exists in one of read-only COW volumes, the data is read from the read only COW volume, and written into the newly created COW volume. The virtual disk device implemented by the hypervisor locates the data by accessing, transparently to the virtual machine, each volume of the chain of volumes comprised by the snapshot, starting from the most recently added volume.

For example, a snapshot of a virtual machine is created by adding a COW volume to a chain of COW volumes. In a COW process, a snapshot of a virtual machine includes the change of the state of the virtual machine from a previous snapshot (or from a base file). In other words, a snapshot of the virtual machine is a copy of the state of the virtual machine (e.g., copy of the virtual machine's disk file) at a given moment in time. In particular, the snapshot of the virtual machine in the chain of COW volumes includes any changes in the state of the virtual machine (e.g., changes in the virtual machine's disk file) with respect to the previously taken snapshot of the virtual machine. In various embodiments, a snapshot is saved as a COW volume on a virtual disk. A virtual disk is a software component that emulates an actual disk storage device in the virtualization environment. A volume is a storage area within a virtual disk. A virtual disk can include a plurality of volumes.

In various embodiments, the chain of COW volumes provides for a data block to be located in different volumes in the chain of COW volumes, e.g., because the same data block may store different data at different points in time. For example, disk volume A, stored in a virtual disk, contains data x in a first data block (e.g., block 0x100). Disk volume A is a COW volume in a chain of COW volumes storing one or more snapshots of the virtual machine. For example, disk volume A (in the chain of COW volumes) includes the change of state of the virtual machine compared to the state of the virtual machine at the time of the previous snapshot of the virtual machine. Upon taking a snapshot of the virtual machine (e.g., disk volume A), disk volume B is created. Disk volume B is now the active volume associated with the virtual machine. As a result, any write operation by the virtual machine is written to disk volume B. When a snapshot is created, a new volume for each disk is created. The new volume is initially empty. The new volume becomes the new active volume when the virtual machine is requested to switch to the new volume (which makes it the newly active volume). From this point on, writes operations go to the new volume. Read operations start from the new active volume. If data is not found within the new active volume, the read operation searches in the parent volume(s) along the chain.

If the virtual machine writes data Y to the first data block (e.g., block 0x100) on the virtual disk, then data Y will be written to disk volume B (the active disk volume). Therefore, data X is maintained in the first data block on disk volume A, thus enabling restoring of the virtual machine to a state at the point in time when the snapshot that is described in the previous step was taken. Accordingly, data X and data Y are stored in different volumes (at different points in time) on the virtual disk. Any subsequent disk volumes created after disk volumes A and B may result in additional data blocks located in the additional volumes in the chain of COW volumes. Accordingly, the COW volumes consume valuable storage resources on the storage device that stores the COW volumes.

In some scenarios, snapshots may exist for a relatively long time (e.g., days, weeks, months, etc.). For example, a snapshot of a virtual machine is taken before installing a security update for a guest operating system. The snapshot may be stored for several weeks in order for the virtual machine to be able to revert back to a previous state of the operating system if the security update causes an issue. As the amount of time that the snapshot is stored increases, so does the probability that additional snapshots are added to the chain of COW volumes.

In the example described above, the chained COW volumes are arranged in a hierarchical order where a more recent volume is at a higher level in the hierarchical order than a less recent volume. In other words, a more recent volume (e.g., disk volume B) shadows a less recent volume (e.g., disk volume A). For example, disk volume A is shadowed by disk volume B. In particular, disk volume B includes the current data Y in the data block and disk volume A includes an older data X in the same data block. Thus, the data block in disk volume A is shadowed by the more recently updated data block in active disk volume B.

It is noted that shadowed data (e.g., outdated data X in disk volume A) is not used by the virtual machine because disk volume B is the active disk volume. As such, shadowed data in disk volume A in the hierarchical COW volume chain (that is not used by the virtual machine) unnecessarily consumes storage in the active virtual disk.

Aspects of the present disclosure address the above and other deficiencies by moving outdated data in a virtual disk volume hierarchy to a backup storage device, which is described in further detail herein. For example, the outdated data is shadowed data. The shadowed data is blocks of data that are present in more than one volume in the virtual disk volume hierarchy (e.g., older data X in a first block in disk volume A and current data Y in the first block in disk volume B). The outdated data is not intended to be used and therefore unnecessarily consumes storage on the active virtual disk. Accordingly, the outdated data is moved from the active virtual disk (on an active storage device) to a backup storage device. As a result, the active storage device has increased storage capacity.

FIG. 1 is a block diagram that illustrates an example of computing system 100. Computing system 100 includes host machine 110 that hosts one or more virtual machines 112 (e.g., VM 112-1, 112-2, **112-*n*, etc.). In one embodiment, computing system is a virtual data center. Host machine 110 includes host operating system 120 and host hardware 140. Host hardware 140 can include one or more processing devices 142 (e.g., central processing unit (CPU), graphical processing unit (GPU), etc.), memory 144, devices 146 and other hardware components. Memory 144 may include volatile memory devices (e.g., random access memory (RAM), non-volatile memory devices (e.g., flash memory), and/or other types of memory devices). The host machine 110** may be a single machine or multiple machines arranged in a cluster.

Each of the devices 146 may be a physical device that is internal or external to the host machine 110. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive, external I/O devices, etc.

Each virtual machine can run a guest operating system (OS). The VMs may have the same or different guest operating systems. The host computer system 100 may be a server, a workstation, a personal computer (PC), a mobile device, etc.

The host computer system 100 runs a hypervisor 130 to virtualize access to the underlying host hardware 140. In doing so, the virtual machine(s) is transparent to the guest OS and a user of the host computing system 100. Hypervisor 130 may also be known as a virtual machine monitor (VMM) or a kernel-based hypervisor. The hypervisor may be a part of the host OS 120 (as shown in FIG. 1), run on top of the host OS, or run directly on the house hardware with an operating system beneath it (e.g., bare metal). Host OS 120 can be the same OS as the guest OS, or can be a different OS.

The host hardware 140 may also be coupled to one or more storage devices 150 and 160 via a direct connection or a network. The storage devices 150 and 160 may be internal storage devices or external storage devices. Examples of storage devices include hard disk drives, optical drives, tape drives, solid state drives, and so forth. Storage devices may be accessible over a local area network (LAN), a wide area network (WAN) and/or a public network such as the internet. Examples of network storage devices include network attached storage (NAS), storage area networks (SAN), cloud storage (e.g., storage as a service (SaaS), etc. In some embodiments, storage devices 150 and 160 are identical to one another. In some embodiments, storage devices 150 and 160 are different from one another. For example, storage device 150 is a fast and reliable (and thus more expensive) storage devices better fit to serve as active storage devices and storage device 160 is a slow (and thus cheap and usually bigger) storage devices better fit to serve as a backup storage device.

Storage device 150 and/or storage device 160 may be a block device that handles data at a block level. The block device may be accessible via small computer system interface (SCSI), internet small computer system interface (iSCSI), Fibre Channel Protocol (FCP), ATA over Ethernet (AoE), or other block I/O protocols. Storage device 150 may be a block device that includes an overlay of a file system that handles data at a file level. The file system may be, for example a network file system (NFS), a common internet file system (CIFS), a fourth extended file system (EXT4), an XFS file system, a hierarchical file system (HFS), a BTRFS file system, or other file system. The capabilities of file systems varies widely, with some basic file systems such as the file allocation table (FAT) file system failing to support advanced features such as thin provisioning and clustered locking, and other file systems such as BTRFS supporting a full range of advanced features such as snapshots, pooling, checksums, clustered locking, and so forth.

In various embodiments, storage device 150 stores images of one or more virtual disks, such as virtual disk 152. A virtual disk is a software component that emulates an actual storage device (e.g., storage device 150). Virtual disk 152 can store data in various formats, such as a portable binary image (e.g., raw), copy-on-write (e.g., COW), compressed loop (e.g., cloop), Quick EMUlator (QEMU) copy-on-write format (e.g., QCOW, QCOW2), and others, such as vmdk, vdi, etc.

Virtual disk 152 includes various volumes such as volumes 154-1, 154-2 and 154-3. In various embodiments, a logical volume may be a storage domain that is virtual and logically separated from the underlying physical storage device (e.g., storage device 150). Volumes 154-1, 154-2 and 154-3, in one embodiment, form a chain of COW volumes. For example, one or more of volumes 154-1, 154-2 and 154-3 store snapshots of a virtual machine state (e.g., virtual machines 112-1, 112-2, or 112-3 at different points in time). As described herein, a snapshot of a virtual machine state can be used to restore the virtual machine to the state that was saved at the reference point in time. In some embodiments, snapshots of a virtual machine save the state of the virtual machine at certain points in time by use of a COW scheme. For example, a snapshot of a virtual machine is created by adding a COW volume to the chain of COW volumes. In a COW process, a snapshot of a virtual machine includes the change (or delta) from a previous snapshot (or from a base file).

Host machine 110, in various embodiments, includes virtualization manager 113. Virtualization manager 113 is a control center of the virtualization environment supported by system 100. Virtualization manager 113, in various embodiments, defines hosts, configures data centers, adds storage, defines networks, creates virtual machines, manages user permissions, etc.

Accordingly, virtualization manager 113, in various embodiments, is able to manage volumes on virtual disk 152 (e.g., volumes 154-1, 154-2 and 154-3). In some embodiments, virtualization manager 113 does not have direct access to storage devices 150 and 160. Typically, the virtualization manager cannot access the storage devices because, in some embodiments, it runs on a different host machine that the storage devices are not connected to (e.g., not direct access). Instead, when the virtualization manager wants to execute some operation on a storage device, it asks one of the machines that runs VMs to execute the operation on the storage device on its behalf.

In some embodiments, the virtualization manager has direct access to the storage devices. For example, the virtualization manager is granted access to the storage devices. Accordingly, the virtualization manager can execute operations on storage devices directly (without going through a host that runs VMs). It is noted that management of the storage devices as described herein with respect to at least FIGS. 2A-4 can be done by various components of system 100. In one embodiment, when virtual manager 113 is directly connected to storage devices 150 and 160, then virtual manager is able to manage storage devices. In another embodiment, host OS 120 of host machine 110 (e.g., when the virtualization manager 113 is not directly connected to storage devices 150 and 160) manages the storage devices.

Figure 2A:
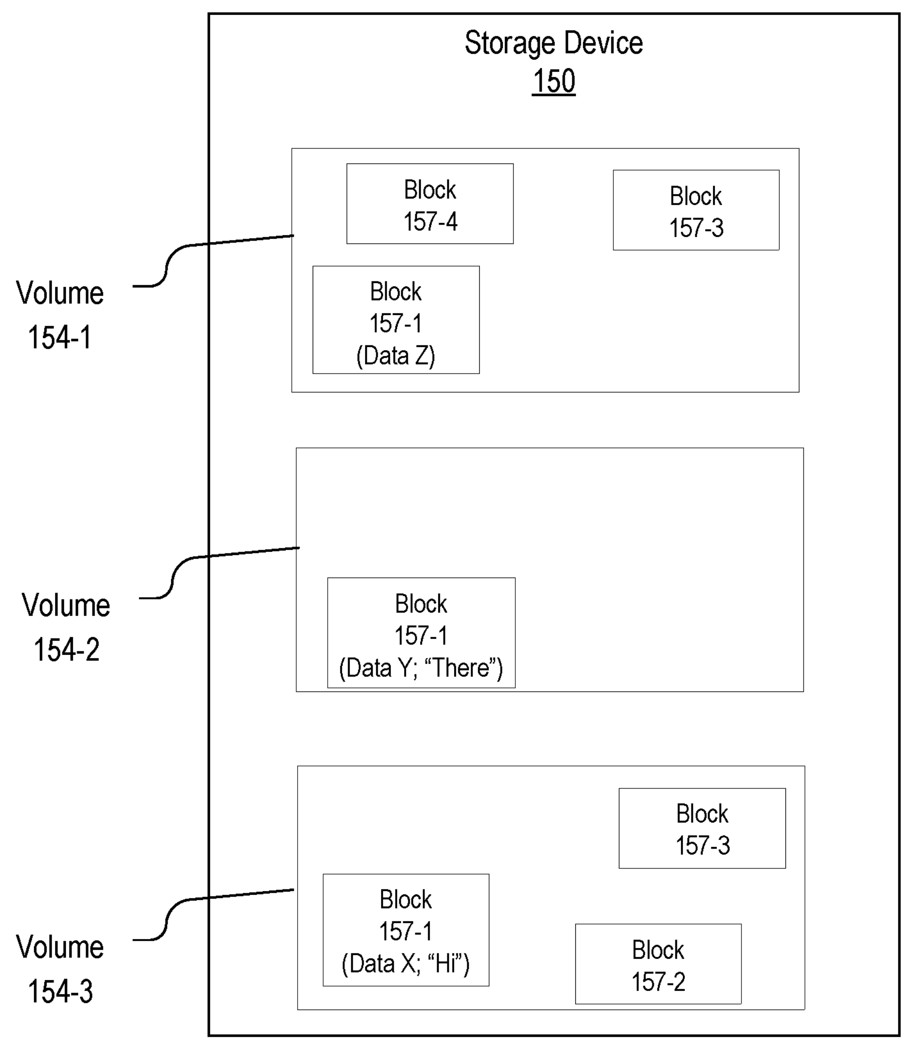
FIG. 2A depicts a block diagram of an example active storage device, in accordance with one or more aspects of the present disclosure.

FIG. 2A is a block diagram that illustrates an example of storage device 150 according to an embodiment. Volumes 154-1, 154-2 and 154-3, in various embodiments, are COW volumes that are arranged in a hierarchical order. For example, volume 154-3 is a snapshot of a virtual machine created at time, $t_1$. Volume 154-2 is a subsequent snapshot of the virtual machine created at time, $t_2$ (e.g., $t_2>t_1$). As a result, volume 154-2 is at a higher level in the hierarchical order of the COW volume chain than volume 154-3.

Volume 154-1, in one embodiment, is an active volume of the virtual machine created in response to the creation of a snapshot. For example, virtualization manager 113 or host OS 120 creates volume 154-1 at time, $t_3$ (e.g., $t_3>t_2$). As a result, volume 154-1 is at higher level in the hierarchical order of the COW volume chain than volume 154-2. As an active volume (e.g., volume 154-1) write operations by the virtual machine are performed on volume 154-1, which will be described in further detail below. In one embodiment, volume 154-1 is a snapshot of the virtual machine created at time, t3 (e.g., $t_3>t_2$). In such an embodiment, a new COW volume is added to the COW volume chain (not shown). The new COW volume is at higher level in the hierarchical order of the COW volume chain than volume 154-1.

Volumes 154-1, 154-2 and 154-3 include various data blocks. A data block stores a specific number of bytes of the virtual disk. The volumes in storage device 150 (e.g., volume 154-1, 154-2, and 154-3) includes hundreds, thousands or tens of thousands of data blocks. However, for the sake of clarity and brevity, as depicted in at least FIG. 2A, the volumes include three data blocks or less. For example, volume 154-3 includes data blocks 157-1, 157-2 and 157-3 (created at time $t_1$), volume 154-2 includes block 157-1 (created at time t2) and volume 154-1 includes block 157-1, block 157-3 and block 157-4. As described above, volume 154-1, in one embodiment, is an active volume. As such, any write operations by the virtual machine are performed on the active volume. Accordingly, in some embodiments, data is written to blocks 157-1, 157-3, and 157-4 while volume 154-1 is an active volume and subsequent to the creation of volume 154-3 (created at time, $t_1$) and subsequent to the creation of volume 154-2 (created at time, $t_2$).

As described herein, a data block may be located in different volumes in the chain of COW volumes. This can result in the data block having different data at different points in time in the COW volumes. For example, while volume 154-3 was an active volume, virtual machine 112-1 wrote data to blocks 157-1, 157-2 and 157-3 in volume 154-3. While volume 154-2 was an active volume, virtual machine 112-1 wrote data to block 157-1 of volume 154-2. While volume 154-1 is an active volume, virtual machine 112-1 writes data to block 157-1, block 157-3 and 157-4.

More specifically, referring to block 157-1 in FIG. 2A, in volume 154-3, block 157-1 includes data X. In volume 154-2, block 157-1 includes data Y (e.g., data X is different than data Y). In volume 154-3, block 157-1 includes data Z (e.g., data Z is different than both data X and data Y). Accordingly, data block 157-1 includes different data at different points in time in the COW volumes.

Referring now to block 157-3 in FIG. 2A, in volume 154-3, block 157-3 includes data A. While volume 154-2 was active, no data was written to block 157-3. Accordingly, volume 154-2 does not include block 157-3. In volume 154-1, block 157-3 includes data B (e.g., data A is different than data B). Accordingly, data block 157-3 includes different data at different points in time in the COW volumes.

As described herein, in one embodiment, a COW volume is a snapshot of a virtual machine that includes the change in the state of the virtual machine compared to a previous snapshot. For example, data Y in block 157-1 (in volume 154-2) is the change of data in block 1570-1 as compared to data X (in volume 154-3). To further illustrate, block 157-1 (in volume 154-3) includes a file with the text "Hi". While volume 154-2 was active, the data in block 157-1 was changed to "Hi There" then block 157-1 (in volume 154-2) would include "There" (which is the change between (1) "Hi" and (2) "Hi There").

In a hierarchical volume chain (e.g., a COW volume chain) the higher order volume is a "child" of the lower order "parent" volume. For example, volume 154-1 is a child of parent volume 154-2. Similarly, volume 154-2 is a child of parent volume 154-3. Volume 154-3, in some embodiments, is referred to as the base volume.

In the hierarchical volume chain, data that resides in a block in a first volume is considered to be "shadowed" by data that resides in the block in a second higher-level volume. For example, data X that resides in block 157-1 in volume 154-3 is shadowed by data Y that resides in block 157-1 in volume 154-2. Similarly, data Y that resides in block 157-1 in volume 154-2 is shadowed by data Z that resides in block 157-1 in volume 154-1. Likewise, data A that resides in block 157-3 in volume 154-3 is shadowed by data B that resides in block 157-3 in volume 154-1.

As described herein, a virtual machine accesses an active volume (e.g., volume 154-1) for write operations and may not access non-active volumes for write operations (e.g., volumes 154-2 and 154-1). As such, shadowed data in the non-active volumes may not be used by the virtual machine for write operations (but may be accessed by the virtual machine for read operations). Since the shadowed data is not used by the virtual machine, the shadowed data unnecessarily consumes valuable storage resources on the storage device.

Figure 2B:
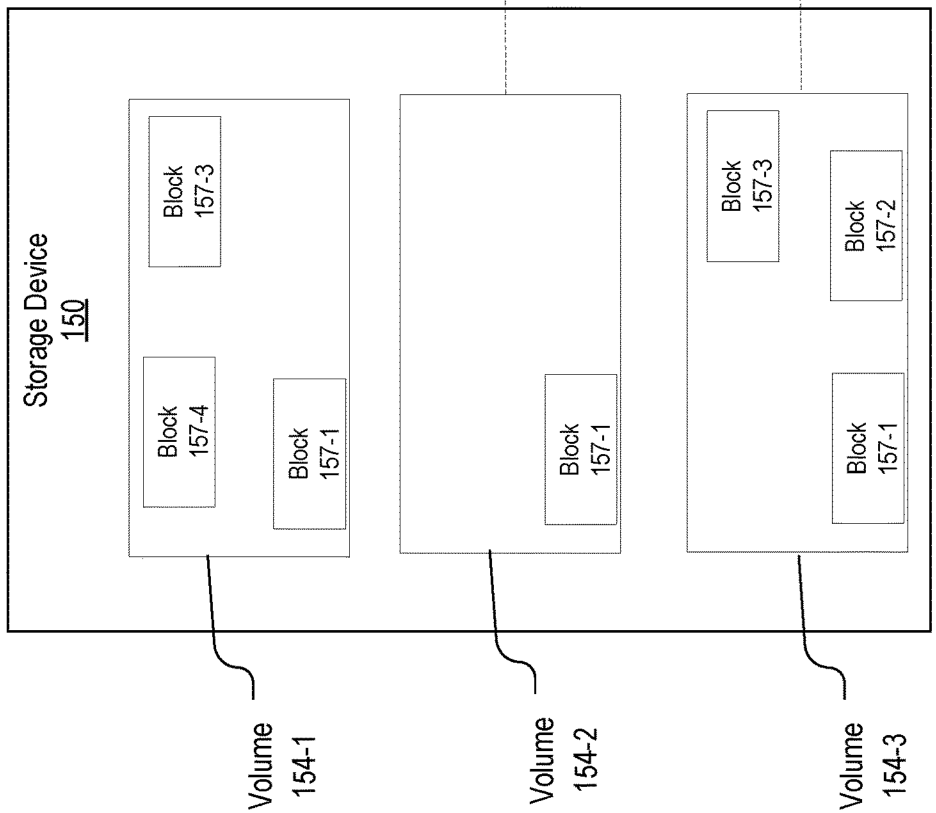
FIG. 2B depicts a block diagram of an example active storage device and a backup storage device, in accordance with one or more aspects of the present disclosure.

FIG. 2B is a block diagram that illustrates an example of storage device 150 and storage device 160 according to an embodiment. FIG. 2B further depicts the transfer of shadowed data from storage device 150 (e.g., active storage device) to storage device 160 (e.g., backup storage device). As described herein, shadowed data is not used by the virtual machine.

The unused shadowed data unnecessarily consumes valuable storage resources on the storage device. As such, the shadowed data is transferred to storage device 160 (e.g., backup storage).

In various embodiments, the transfer of shadowed data to storage device 160 is triggered in response to a client (e.g., IT administrator) requesting the transfer of the shadowed data. In another embodiment, virtualization manager 113 (or host OS 120) monitors the volumes in storage device 150 that includes the shadowed data. When the size of the shadowed data exceeds a predetermined threshold (e.g., a predetermined amount of storage space in storage device 150), virtualization manager 113 (or host OS 120) triggers the transfer of the shadowed data to storage device 160.

In one embodiment, volumes in the COW volume chain in virtual disk 152 are identified. For example, virtualization manager 113 (or host OS 120) identifies a plurality of COW volumes in virtual disk 152. In such an example, virtualization manager 113 (or host OS 120) identifies volumes 154-1, 154-2 and 154-3 in a COW volume chain in virtual disk 152. In one embodiment, virtualization manager 113 (or host OS 120) stores the identified volumes in table 145 of memory 144. The virtualization manager knows the active volume of each disk. Since each volume holds its parent's volume, the hierarchy structure (e.g., identity of the volumes) can be retrieved.

In one embodiment, shadowed blocks in the COW volume chain in storage device 150 are identified. In other words, virtualization manager 113 (or host OS 120) determines whether a block is present in a first volume and a second volume where one of the volumes is at a higher level in the hierarchical order than the other volume. As described herein, the block that is present in two separate volumes contains different data at different points in time. In one embodiment, virtualization manager 113 (or host OS 120) identifies each of the shadowed blocks in COW volume chain in virtual disk 152. For example, virtualization manager 113 (or host OS 120) determines that block 157-1 in volume 154-3 and block 157-1 in volume 154-2 are both shadowed by block 157-1 in volume 154-1. Similarly, virtualization manager 113 (or host OS 120) determines that block 157-3 in volume 154-3 is shadowed by block 157-3 in volume 154-1. In such an example, virtualization manager 113 (or host OS 120) determines that block 157-2 (in volume 154-3) and block 157-4 (in volume 154-1) are not shadowed because block 157-2 and block 157-4 are not found in any other volumes in the COW volume chain. Additionally, virtualization manager 113 (or host OS 120) determines that block 157-1 in volume 154-1 and block 157-3 in volume 154-1 are not shadowed.

In one embodiment, virtualization manager 113 (or host OS 120) determines whether a given block in the COW volume chain is a shadowed block by iterating through the COW volume chain (e.g., iterating top-down or bottom-up). Iterating through the COW volume chain is the inspecting of a volume and then inspecting its parent volume (starting from the active volume). For each block that is found in the volume chain, virtualization manager 113 (or host OS 120) determines if the block is contained in a higher-level volume. For example, as described herein, virtualization manager 113 (or host OS 120) determines that block 157-1 in volume 154-3 and block 157-1 in volume 154-2 are both shadowed by block 157-1 in volume 154-1. In one embodiment, upon identifying the shadowed blocks, virtualization manager 113 (or host OS 120) stores a list of the shadowed blocks in a data structure (e.g., table 145 in memory 144). For example, table 145 maps a volume to a list of the shadowed blocks inside the volume. The table is used to determine which volumes contain shadowed data. In various embodiments, the table is used by the virtualization manager to find a volume that is mapped to a non-empty list of shadowed blocks and move those shadowed blocks to the backup storage device.

In various embodiments, virtualization manager 113 (or host OS 120) identifies COW volumes that contain the shadowed blocks. For example, virtualization manager 113 (or host OS 120) determines that volume 154-3 and volume 154-2 are the volumes in the COW volume chain that contain shadowed data. In particular, volume 154-3 includes shadowed blocks 157-1 and 157-3. Additionally, volume 154-2 includes shadowed block 157-1.

In one embodiment, virtualization manager 113 (or host OS 120), when iterating through the COW volume chain (as described above), identifies the volumes that include the shadowed blocks. Moreover, in one embodiment, virtualization manager 113 (or host OS 120) stores a list of volumes that include the shadowed blocks (e.g., table 145 in memory 144).

In various embodiments, virtualization manager 113 (or host OS 120) creates backup volumes in a backup storage device (e.g., storage device 160). The backup volumes correspond to the volumes in the active storage device (e.g., storage device 150) that contain shadowed data. For example, virtualization manager 113 (or host OS 120) creates backup volume 254-3 (corresponding to volume 154-3) in storage device 160. Similarly, virtualization manager 113 (or host OS 120) creates backup volume 254-2 (corresponding to volume 154-2) in storage device 160. Data that is contained in the top active volume (e.g., volume 154-1) is not shadowed by any other volume. As such, a corresponding volume for the top volume is not created in the backup storage device.

In various embodiments, the backup volumes are thin-provisioned volumes. For example, virtualization manager 113 (or host OS 120) creates the thin-provisioned volumes. Thin provisioning gives the appearance of a volume having more physical resources than are actually available. Thin-provisioning is the allocation of storage based on what is needed. In various embodiments, initially, thin-provisioned volumes are empty (or very small) and their size increases as needed while they are being written. In some embodiments, virtualization manager 113 (or host OS 120) creates a thin-provisioned volume using virtualization utilities such a qemu-img. Qemu-img is for formatting various file systems. Qemu-img is also used for formatting guest images, additional storage devices and network storage.

In various embodiments, virtualization manager 113 (or host OS 120) copies the data from the shadowed block to the corresponding volume in the backup storage device. For example, virtualization manager 113 (or host OS 120) copies block 157-1 (in volume 154-3) to block 257-2 (in backup volume 254-3), and copies block 157-3 (in volume 154-3) to block 257-3 (in backup volume 254-3). Similarly, virtualization manager 113 (or host OS 120) copies block 157-1 (in volume 154-2) to block 257-1 (in backup volume 254-2). In one embodiment, virtualization manager 113 (or host OS 120) copies blocks from storage device 150 to storage device 160 in response to creating a backup storage volume in the backup storage, as described herein.

In one embodiment, while virtualization manager 113 (or host OS 120) iterates through the COW volume chain (as described above), virtualization manager 113 (or host OS 120) identifies the volumes that include the shadowed blocks. In various embodiments, the iteration through the COW volume chain to identify the volumes that include the shadowed blocks is in response to (1) a client (e.g., IT administrator) requesting the transfer of the shadowed data or (2) the size of the shadowed data exceeds a predetermined threshold (e.g., a predetermined amount of storage space in storage device 150). Moreover, in one embodiment, virtualization manager 113 (or host OS 120) stores a list of volumes that include the shadowed blocks (e.g., the table in memory 144).

In various embodiments, virtualization manager 113 (or host OS 120) removes the data from the shadowed blocks in the active storage device that were copied to the backup storage device (and/or deallocates the blocks). For example, virtualization manager 113 (or host OS 120) removes data from block 157-1 (in volume 154-2), block 157-1 (in volume 154-3) and block 157-3 (in volume 154-3). In one embodiment, virtualization manager 113 (or host OS 120) removes the data from the shadowed block by writing zeros to the block. In one embodiment, virtualization manager 113 (or host OS 120) removes the data from the shadowed blocks in the active storage in response to updating the volumes on the active storage device (e.g., marking the volume header to indicate the contents of the shadowed block exist in a backup volume in the backup storage device).

Upon removal of the data from the shadowed blocks in the active storage device, the shadowed blocks are marked to indicate that they were moved to the backup storage device. In one embodiment, virtualization manager 113 (or host OS 120) marks a header of COW volume to indicate the contents of the shadowed block exist in a backup volume in the backup storage device. For example, virtualization manager 113 (or host OS 120) marks a header of volume 154-2 to indicate that the contents of block 157-1 (in volume 154-2) exist in backup volume 254-2 of backup storage device 160. Similarly, virtualization manager 113 (or host OS 120) marks a header of volume 154-3 to indicate that the contents of block 157-1 and block 157-3 (in volume 154-3) exist in backup volume 254-3 of backup storage device 160. In various embodiments, the marking of the header indicates the corresponding backup volume on the backup storage device and also flags the blocks that were moved to that backup volume. It is noted that read/write access is not affected. For example, non-active volumes are not written to, by the virtual machine, and the shadowed data that was moved is not read, by the virtual machine.

In another embodiment, virtualization manager 113 (or host OS 120) saves the metadata (that indicates that the shadowed blocks are moved to the backup storage device) separately. For example, virtualization manager 113 (or host OS 120) saves the metadata to a separate volume. The separate volume that includes the metadata can be saved in virtual disk 152 along with original volume that includes the shadowed blocks. That is, the details of the corresponding backup volume on the backup storage device and a list of the shadowed blocks that were moved to it can be stored as "volume metadata" in a separate file. In one embodiment, the separate file is not within the volume. It is noted that read/write access is not affected. For example, non-active volumes are not written to, by the virtual machine, and the shadowed data that was moved is not read, by the virtual machine.

In one embodiment, virtualization manager 113 (or host OS 120) sparsifies the modified volumes. The modified volumes are the volumes in storage device 150 that included the shadowed blocks (that were copied to storage device 160 and removed from storage device 150). Sparsifying is a storage-specific operation to free unused space. For example, sparsifying enables free disk space on the disk image to be converted to free space on the host. Sparsifying is the process of taking zero blocks (e.g., blocks containing zeros) within a volume and making them available for (being allocated to) others. Virtualization manager 113 (or host OS 120), in one embodiment, sparsifies volumes 154-2 and 154-3. This means that free space within the disk image can be converted back to free space on the host.

FIG. 2C is a block diagram that illustrates an example of storage device 150 and storage device 160 according to an embodiment. In particular, FIG. 2C depicts a result of restoring a snapshot in the COW volume chain. For example, a snapshot of the virtual machine (e.g., volume 154-2) is restored.

In one embodiment, virtualization manager 113 (or host OS 120) removes volume 154-1 from storage device 150. Virtualization manager 113 (or host OS 120) determines that block 157-1 in volume 154-2 is no longer shadowed and block 157-3 in volume 154-3 is no longer shadowed. For example, virtualization manager 113 (or host OS 120) refers to table 145 to determine that block 157-1 in volume 154-2 and block 157-3 in volume 154-3 are no longer shadowed when volume 154-1 (that includes blocks 157-1 and 157-3) is removed. It is noted that block 157-1 in volume 154-3 is still shadowed by block 157-1 in volume 154-2. As such, block 257-1 remains in volume 254-3. When restoring a snapshot, each of the higher-level volumes in the volume chain compared to its volume are removed. For example, virtualization manager 113 (or host OS 120) removes the volumes with standard tools for removing volumes (e.g., 'rm' in case of file-based volumes).

In various embodiments, virtualization manager 113 (or host OS 120) copies data in block 257-1 in volume 254-2 back to block 157-1 in volume 154-2. Similarly, virtualization manager 113 (or host OS 120) copies data in block 257-3 in volume 254-3 back to block 157-3 in volume 154-3. For example, virtualization manager 113 (or host OS 120) uses qemu-img to copy data in block 257-1 in volume 254-2 back to block 157-1 in volume 154-2 and data in block 257-3 in volume 254-3 back to block 157-3 in volume 154-3.

In some embodiment, upon copying data from storage device 160 back to storage device 150, empty volumes in storage device 160 are removed. For example, virtualization manager 113 (or host OS 120) removes volume 254-2 (that previously held block 257-1) from storage device 160.

In some embodiment, upon copying data from storage device 160 back to storage device 150, modified volumes in storage device 160 are sparsified. For example, virtualization manager 113 (or host OS 120) sparsifies volume 254-3 in response to removal of data block 257-3. As a result, free space within storage device 160 can be converted back to free space on the host. Additionally, upon copying data from storage device 160 back to storage device 150, headers of the volumes in storage device 150 are updated to reflect the new state (e.g., corresponding volume on storage device 160 was removed, corresponding blocks in storage device 160 were removed from storage device 160, etc.)

FIG. 3 depict a flow diagram for method 300 for copying redundant data from an active storage device to a backup storage device. Method 300 may be performed by processing devices that may comprise hardware (e.g., circuitry, dedicated logic, programmable logic, microcode, etc.), executable code (such as is run on a general purpose computer system or a dedicated machine), or a combination of both. Method 300 each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by system 100 as shown in at least FIG. 1.

Referring to FIG. 3, at 310 of method 300, a plurality of disk volumes of a virtual disk stored on a first storage device is identified. The disk volumes are arranged in a hierarchical order. For example, virtualization manager 113 (or host OS 120) identifies volumes 154-1, 154-2 and 154-3 in a COW volume chain in virtual disk 152. In one embodiment, the COW volume chain is a hierarchical volume chain of virtual machine snapshots.

At 320, a block that is present in a first disk volume and a second disk volume of the plurality of disk volumes is identified. The second disk volume is at a higher level in the hierarchical order than the first disk volume. For example, virtualization manager 113 (or host OS 120) determines that block 157-1 in volume 154-3 and block 157-1 in volume 154-2 are both shadowed by block 157-1 in volume 154-1. Similarly, virtualization manager 113 (or host OS 120) determines that block 157-3 in volume 154-3 is shadowed by block 157-3 in volume 154-1. In such an example, virtualization manager 113 (or host OS 120) determines that block 157-2 (in volume 154-3) and block 157-4 (in volume 154-1) are not shadowed because block 157-2 and block 157-4 are not in any other volumes in the COW volume chain.

At 330, data on the first storage device is copied to a backup disk volume residing on a second storage device. For example, virtualization manager 113 (or host OS 120) copies block 157-1 (in volume 154-3) to block 257-2 (in backup volume 254-3), and copies block 157-3 (in volume 154-3) to block 257-3 (in backup volume 254-3). Similarly, virtualization manager 113 (or host OS 120) copies block 157-1 (in volume 154-2) to block 257-1 (in backup volume 254-2).

Figure 4:
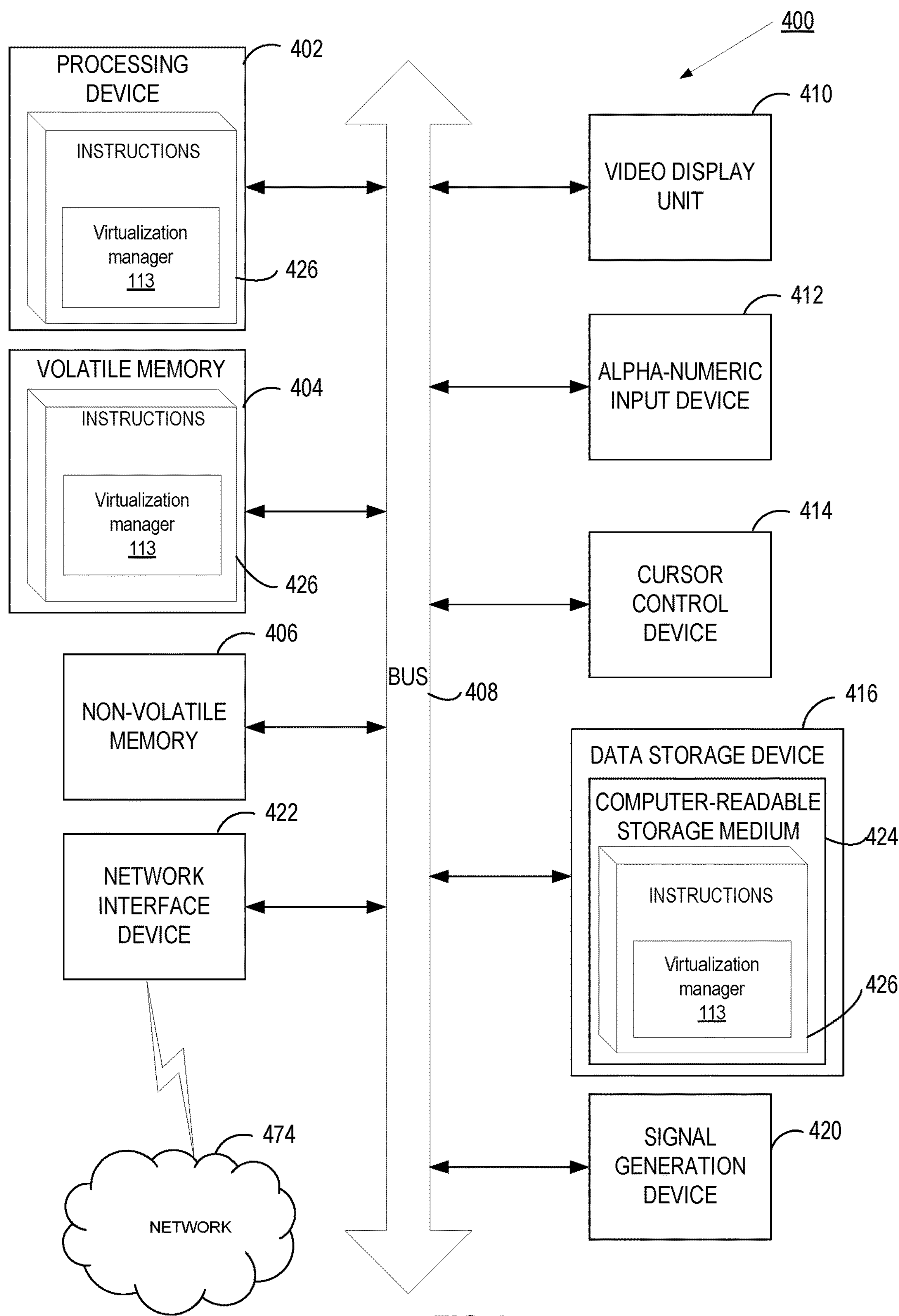
FIG. 4 depicts a block diagram of an illustrative computing device operating in accordance with the examples of the present disclosure.

FIG. 4 depicts a block diagram of a computer system operating in accordance with one or more aspects of the present disclosure. In various illustrative examples, computer system 400 may correspond to system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alphanumeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions for implementing method 300 and for encoding DMA 240.

Instructions 426 may also reside, completely or partially, within volatile memory 404 and/or within processing device 402 during execution thereof by computer system 400, hence, volatile memory 404 and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "analyzing," "selecting," "building," "classifying," "updating," "optimizing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

identifying, by a host computing device hosting a virtual machine, a plurality of disk volumes of a virtual disk stored on a first storage device, wherein the disk volumes are arranged in a hierarchical order;

determining, by the host computing device, that a block of data is present in both a first disk volume and a second disk volume of the plurality of disk volumes, wherein the second disk volume is at a higher level in the hierarchical order than the first disk volume;

responsive to determining that the block of data is present in both the first disk volume and the second disk volume, copying, by the host computing device, data from the block of data stored on the first storage device to a backup disk volume residing on a second storage device; and responsive to copying the data from the block of data to the backup disk volume, removing, by the host computing device, the block of data from the first disk volume on the first storage device.

2. The method of claim 1, further comprising:

in response to determining that the block of data is present in both the first disk volume and the second disk volume, creating the backup disk volume on the second storage device, wherein the backup disk volume is associated with the first disk volume on the virtual disk.

3. The method of claim 1, further comprising:

determining that the block of data is present in a third volume of the plurality of disk volumes, wherein the third volume is at a higher level in the hierarchical order than the second disk volume; and copying data from the block of data on the second disk volume to the backup disk volume.

4. The method of claim 1, further comprising:

determining that the block of data is present in a third disk volume of the plurality of disk volumes, wherein the third disk volume is at a lower level in the hierarchical order than the first disk volume; and copying data from the block of data on the third disk volume on the first store device to the backup disk volume.

5. The method of claim 1, further comprising:

identifying a third disk volume is at a hierarchical level between the first disk volume and the second disk volume; and copying the data from the block of data stored on the first disk volume to the backup disk volume.

6. The method of claim 1, further comprising:

marking a header of the block of data, wherein the marking indicates that the block of data is stored in the backup disk volume.

7. The method of claim 1, further comprising:

in response to copying the data from the block of data stored on the first storage device to a backup disk volume, storing, in a data table, a flag indicating that the block of data is stored in the backup disk volume.

8. The method of claim 1, further comprising:

receiving a request to restore a state of a virtual machine that is stored in the first disk volume;

copying the data from the backup disk volume to the first disk volume; and removing the second disk volume from the virtual disk.

9. A non-transitory computer readable storage medium having instructions that, when executed by a processing device, cause the processing device to perform a method comprising:

determining that a block of data is present in a first volume and a second volume in a virtual disk on a first storage device, wherein the first volume is a snapshot of a virtual machine created at a first time, and the second volume is snapshot of the virtual machine created at a second time later than the first time;

in response to determining that the block of data is present in the first volume and the second volume, copying data from the block of data of the first volume on the first storage device to a backup volume on a second storage device; and in response to copying the data from the block of data of the first volume on the first storage device to the backup volume on the second storage device, removing the block of data from the first volume on the first storage device.

10. The non-transitory computer readable storage medium of claim 9, further comprising:

in response to determining that the data in the block of data is present in the first volume and the second volume, creating the backup volume on the second storage device, wherein the backup volume is associated with the first volume on the virtual disk.

11. The non-transitory computer readable storage medium of claim 9, further comprising:

determining the block of data is present in a third volume, wherein the third volume is snapshot of the virtual machine created at a third time after the second time; and copying data from the block of data on the first volume to the second storage device and from the block of data on the second volume on the first store device to the second storage device.

12. The non-transitory computer readable storage medium of claim 9, further comprising:

determining the block of data is present in a third volume, wherein the third volume is snapshot of the virtual machine created at a third time before the first time; and copying data from the block of data on the second volume on the first store device to the second storage device, and from the block of data on the third volume on the first store device to the second storage device.

13. The non-transitory computer readable storage medium of claim 12, further comprising:

receiving a request to restore a state of the virtual machine that is stored on the first volume; and in response to receiving the request, copying the data associated with the block of data on the first volume from the backup volume on the second storage device to the first volume on the first storage device.

14. The non-transitory computer readable storage medium of claim 13, further comprising:

removing the second volume from the first storage device.

15. The non-transitory computer readable storage medium of claim 12, further comprising:

receiving a request to restore a state of the virtual machine stored on the third volume; and in response to receiving the request, copying the data associated with the block of data on the third volume from a corresponding backup volume on the second storage device to the third volume on the first storage device.

16. The non-transitory computer readable storage medium of claim 15, further comprising:

removing the second volume and the first volume from the first storage device, and a corresponding second volume and a corresponding first volume from the second storage device.

* * * * *